Patented Dec. 4, 1951

2,576,944

UNITED STATES PATENT OFFICE 2,576,944

DENTURE COMPOSITION CONTAINING VINYLIDENE CHLORIDE - ACRYLONITRILE COPOLYMER AND METHYL METHACRYLATE MONOMER AND POLYMER

Homer van Beuren Joy, Montclair, N. J., assignor, by direct and mesne assignments, of one-half to Montclair Research Corporation, a corporation of New Jersey, and one-half to Ellis-Foster Company, a corporation of New Jersey No Drawing. Application April 30, 1947, Serial No. 745,119

4 Claims. (Cl. 260—45.5)

The present invention relates to dentures, to materials and compositions for producing such dentures, and to methods of making compositions, materials and dentures.

The production of dentures is an exacting art. An ideal denture base material should meet the following requirements: it should be easy to manipulate; it should have sufficient strength and resilience at mouth temperatures to resist all normal masticating stresses; it should be easy to repair and should neither shrink nor expand during fabrication of the denture; it should have sufficient impact strength to resist unavoidable accident (such as dropping on the floor); it should have a relatively high thermal conductivity—in connection with which it may be noted that all resins are poor in this respect—it should be impermeable to mouth fluids and resist bacterial action and growth; it should harmonize with the soft tissues in color and translucency and should retain such properties in the mouth indefinitely; it should be tolerable to the mouth tissues and should be both odorless and tasteless; it should have a low specific gravity; and it should retain its shape whether in or out of the mouth.

Dentures have been made in the prior art from many substances but suffer from many disadvantages. Metallic dentures are strong and very sanitary, and their high thermal conductivity is advantageous in comparison to synthetic resins. But the disadvantages are that they are heavy and objectionable from an esthetic standpoint unless coated with other materials. Many of the stainless alloys are very difficult to fabricate because of their high melting point and hardness. Gold and its alloys are widely used in this country for partial dentures and stainless steel is frequently used in England.

Porcelain is satisfactory from an esthetic standpoint but it is brittle and breaks easily if accidentally dropped. It is also difficult to fabricate and its use has not been widespread. Glass dentures are likewise so difficult to fabricate that they have found little use.

Among the non-metallic materials, hard rubber also known as vulcanite or ebonite, was by far the most satisfactory over a period of many years. Its disadvantages are its lack of esthetic appeal, low thermal conductivity, lack of resistance to bacterial growth, continued shrinkage upon revulcanization, and the bulk needed to provide sufficient strength.

Various cellulose esters were placed on the market shortly after dental vulcanite was introduced but they soon fell into disuse. They are at first agreeable esthetically but they absorb water, swell, and gradually deteriorate. The plasticizers wash out and the color changes to a dirty brown.

Phenol formaldehyde resins have been used in this country but they soon become discolored. Styrene resins have been unsatisfactory because of excessive brittleness. The alkyd resins which have been tested for dental use cured too slowly. Urea resins have been suggested for dental use but their water-resistance is poor.

These considerations show that the production of a satisfactory dental resin is a matter of great difficulty.

At the present time, two resins are used in a great majority of cases. Methyl methacrylate polymer plasticized with monomeric liquid has been very satisfactory in most respects, and has by far, today, the greatest market. Its color stability is excellent and its mechanical properties are good. The best known brands are "Lucitone" and "Vernonite." The methyl methacrylate polymer, on the whole, has been a reasonably satisfactory material, but dental laboratories would like to have a resin with lower cure-shrinkage and lower water-absorption and higher impact strength to reduce breakage.

A vinyl chloride-acetate copolymer resin, plasticized by monomeric methyl methacrylate is sold in some volume under the trade name "Luxene 44." Its color stability is good although considerably inferior to the methacrylates but its impact strength is extremely high and its water absorption is very low. It is, however, very difficult to process because the mixture is so rubbery. Special injection equipment is required. Also, the rigidity is quite low and the material is much softer than the methyl methacrylate polymer.

The most common method of making dentures is to mix methyl methacrylate polymer beads with about half their weight of methyl methacrylate monomer in a mortar for about 15 minutes to form a plastic dough which is then placed in a dental flask and cured. This is known as the powder-liquid technique. The "flask" is a very simple device. It is merely two brass frames which are pressed together by a screw clamp. The plaster inside the brass frames is hollowed out to form a mold in which the porcelain teeth and the plasticized resin are placed. The denture is covered with tin foil to protect it from water during the cure. The pressure employed under such circumstances obviously is low.

While methyl methacrylate polymers as set forth above are used very widely, they nevertheless are subject to substantial curing shrinkage. When the resins are cured over a metal form which looks somewhat like an opera hat, material produced in accordance with the methyl methacrylate polymer formulation shrinks enough so that the fit is visibly poor and the resin can be made to wobble on the form. Further methyl methacrylate polymers, over a period of several weeks, absorb enough water from the mouth to compensate for the cure shrinkage but the initial bad fit which occurs while the gums are still tender from the extraction of the teeth, is highly objectionable.

Among the objects of the present invention is the production of dentures of high impact strength, low water absorption, and low curing shrinkage.

Other objects include the production of compositions enabling such dentures to be produced, and have desirable properties from the standpoint of being utilized by present day technique in handling the compositions in the production of dentures.

Still further objects include methods for producing the dentures and such compositions.

Still further objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

In accordance with the present invention it has been found that dentures of satisfactory impact strength, low water absorption, low curing shrinkage, and other properties as set forth above which are essential in producing dentures may be produced by utilizing a copolymer of vinylidene chloride and acrylonitrile following the technique ordinarily employed in the production of dentures from the methyl methacrylate polymers under present day practice. A denture produced from such copolymer alone employing, however, a monomeric curable acrylic acid ester plasticizer, such as monomeric methyl methacrylate, gives a denture with a very high impact strength and uniquely low water absorption, but the uncured mixture is somewhat rubbery and difficult to pack into the mold and the rigidity is lowered. Consequently it is preferred to utilize the vinylidene chloride-acrylonitrile copolymer with methyl methacrylate polymer. And for such purposes the best types of results are obtained where the composition contains not more than 85% of the polymeric methyl methacrylate, the balance of the polymer being the vinylidene chloride-acrylonitrile copolymer, most desirable results being obtained where the ratio is from 75 to 50% of methyl methacrylate polymer and 25 to 50% of the vinylidene chloride-acrylonitrile copolymer.

The vinylidene chloride and acrylonitrile copolymer desirably employed may contain from 50 to 90% of the vinylidene chloride, the copolymer produced with 80% of vinylidene chloride to 20% of acrylonitrile giving the most desirable results. Such copolymers may be produced with varying viscosities and a copolymer of this character employed in the present invention should desirably have a viscosity of at least 1000 centipoises and may be very much higher as 8000 centipoises and higher. The viscosities are determined on a 20% solution in methyl ethyl ketone at 25° C. using a Brookfield viscosimeter. The 8000 centipoise material gives an excellent product, but viscosities as low as 1000 may be used. The lower viscosities give low water-absorption and low cure-shrinkage, but the impact strength and transverse strength are lower than those of the 8000 centipoise material. As exemplary of a copolymer material available on the market that may be employed, mention may be made of "Saran F 120." Such copolymers frequently contain a substantial amount of curing catalyst and may be employed without addition of other catalysts such as the organic peroxides to be mentioned later. It might be mentioned in passing that as to products like "Saran F 120," four ketones, namely, methyl ethyl ketone, cyclohexanone, mesityl oxide, and isophorone, are true solvents for the 1000 centipoise type. Many other liquids such as ketones, esters, and alcohols are latent solvents and may replace in part the true solvents referred to above.

The methyl methacrylate polymer is usually employed in the form of beads, the size of such beads not being critical but it is preferred to use beads which pass a 60 mesh sieve as this reduces the chance that mechanical separation from the other polymer may occur. The vinylidene chloride-acrylonitrile copolymer is desirably used in the form of a fine powder since larger particles may cause spots.

In employing the copolymer of vinylidene chloride and acrylonitrile, with the methyl methacrylate polymer in accordance with the present invention, in the production of dentures, the powder-liquid technique referred to above is desirably employed as this insures long shelf-life. In such cases there is utilized with such mixed polymer and copolymer, a monomeric curable acrylic acid ester plasticizer following the powder-liquid technique as set forth above, specifically monomeric methyl methacrylate. The resin mixtures themselves may be produced in the form of sheets or plastic cakes by mixing in any desirable mixer as in a cooled Banbury mixer or on a cooled rubber mill provided that precautions are taken to minimize evaporation. The plastic cakes should be stored below 55° F.

The catalyst employed in producing dentures from such mixtures of polymer and copolymer is desirably an organic peroxide such as benzoyl peroxide. Other hydrocarbon soluble peroxides such as lauroyl or tertiary butyl hydroperoxide may be employed. The amount of catalyst employed depends on various factors. For a plastic cake as little as 0.05% may be used. In a powder-liquid, 2 or 3% or more, based on the monomer may be used. In general it is not necessary to use more than 1%. The catalyst may be dissolved in the liquid or mixed with the resins and as pointed out above, may be present in some of the copolymer even as these materials are available on the market. The monomeric curable acrylic acid ester plasticizer employed is most desirably monomeric methyl methacrylate. This may be used in varying proportions with the resin mixture. Desirably 6 cc. of monomeric methyl methacrylate may be employed to 15 grams of resin mixture. As little as 5 cc. and upwards of 8 cc. and more may be employed, but the lower the liquid content, the lower is the cure-shrinkage.

Compositions produced in accordance with the present invention have an important processing advantage over the methyl methacrylate polymers heretofore available in the art. In using straight methyl methacrylate polymers in accordance with present practice, dental laboratories are able to mix and cast one specimen or denture at a time since the time interval in which the mixture has the correct consistency for packing is very short. On the other hand, with compositions of the present invention, the mix is softer and it may be packed over varying periods of time, for example, of from 2 minutes to 1 hour. For example, 60 grams of resin were mixed in accordance with the proportions set forth above with the liquid monomeric methyl methacrylate ester in a mortar and from this single mixture it was possible to cast a series of specimens over a substantial period of time.

The curing is effected by heating, the technique being exactly the same as that used in the usual methyl methacrylate powder-liquid technique. Since methyl methacrylate boils at 100° C. and the polymerization is exothermic, the temperature should be raised gradually and the bath should not reach 100° C. until near the end of the cure.

A number of dentures have been cast from resin mixtures produced in accordance with the present invention and have been worn with entire satisfaction by a number of persons. There is no irritation of mouth tissues. The dentures are, of course, colored to match mouth tissues. About 0.1% or less of a mixture of titanium dioxide and cadmium reds gives a good color. Certain organic pigments may be used, but they should be extremely stable to light and should not cause any irritating effects. Titanium dioxide also functions as an opacifier. For the best esthetic effects it is necessary to match the color of the gums and also to obtain about the same degree of translucency.

The following examples illustrate compositions produced in accordance with the present invention and utilized in making dentures.

Example 1

"Saran F 120" (8000 cps.) _____g__ 14
Methyl methacrylate (monomer) _____cc__ 6
Benzoyl peroxide _____g__ 0.06

Example 2

Methyl methacrylate (polymer) _____g__ 9
"Saran F 120" (8000 cps.) _____g__ 3
Methyl methacrylate (monomer) _____cc__ 6
Benzoyl peroxide _____g__ 0.06

Example 3

Methyl methacrylate (polymer) _____g__ 10.0
"Saran F 120" (8000 cps.) _____g__ 5.0
Methyl methacrylate (monomer) _____cc__ 5.5
Benzoyl peroxide _____g__ 0.06

Example 4

Methyl methacrylate (polymer) _____g__ 10.0
"Saran F 120" (1000 cps.) _____g__ 5.0
Methyl methacrylate (monomer) _____cc__ 6.0
Benzoyl peroxide _____g__ 0.06

Example 5

Methyl methacrylate (polymer) _____g__ 10.0
"Saran F 120" (8000 cps.) _____g__ 5.0
Methyl methacrylate (monomer) _____cc__ 6.0
Benzoyl peroxide _____g__ 0.06

The tests in the following table were made on specimens cured 1 hour at 160° F., ½ hour to 212° F., and ½ hour at 212° F. In the table resins A and B are commercial methyl methacrylate materials, C is a commercial vinyl-chloride-acetate resin plasticized by methyl methacrylate monomer, and the numbers in the table (1), (2), (3), etc., refer to the resins produced in the examples given above.

| Resin | Impact Strength | Rigidity (0.10″) | Rockwell Hardness | Water-Absorption | Solubility | Curing Shrinkage | Transverse Strength | | |
|---|---|---|---|---|---|---|---|---|---|
| | | | | | | | 4000 g. | 6000 g. | max. load |
| | Cm. kg./cm.² | ° F. | | Mg./cm.² | Mg./cm.² | | Mim. | Mim. | G. |
| A | 10.0 | 225 | 100 | 0.60 | 0.03 | over 0.4 | 2.66 | 7.09 | 6,500 |
| B | 10.6 | 235 | 102 | 0.55 | 0.03 | over 0.4 | 2.14 | 4.63 | 6,500 |
| C | 18.0 | 192 | 89 | 0.20 | 0.02 | over 0.252 | 2.20 | 5.10 | 7,000 |
| 1 | 17.0 | | 104 | 0.06 | 0.065 | | 2.10 | 4.45 | 7,500 |
| 2 | 12.1 | | 104 | 0.30 | 0.020 | 0.32 | 2.45 | 5.70 | 7,000 |
| 3 | 12.9 | | 104 | 0.28 | | 0.235 | 2.45 | 5.10 | 7,000 |
| 4 | 11.3 | | 104 | 0.268 | 0.030 | 0.26 | 2.60 | 6.20 | 6,400 |
| 5 | 12.9 | 224 | 104 | 0.255 | 0.023 | 0.238 | 2.40 | 5.60 | 7,000 |

A most surprising property obtained in dentures produced with compositions of the present invention is the low curing shrinkage. This is lower than that of any of the present commercial resins, much lower than the methyl methacrylate materials, and has only been equaled by the obsolete hard rubber. When the material is cured over a metal form, it fits snugly and does not wobble as contrasted with ordinary methyl methacrylate polymer material which as pointed out above, shrinks enough to wobble appreciably. Thus a better fit is obtained in dentures with resin having extremely low cure shrinkage as produced in accordance with the present invention. It is remarkable that replacing as little as 25% of the methyl methacrylate polymer with the vinylidene chloride-acrylonitrile copolymer, causes so great an improvement in properties.

In carrying out the present invention emphasis has been placed on methyl methacrylate monomer as the monomeric curable acrylic acid ester plasticizer employed. It is by far the most preferable material to utilize since other esters even of acrylic acid and substituted acrylic acids are not as satisfactory. However, for some purposes other monomeric curable ester plasticizers may be utilized, for example, esters of acrylic acid per se and substituted acrylic acids where the substituent group and the ester forming group are a lower alkyl or alkylene group or aryl or aralkyl, lower alkyl or alkylene referring to a carbon atom content below 3 preferably. Thus ethyl methacrylate may be used or mixtures of methyl and ethyl methacrylates. The term an acrylic acid ester may be used to cover such esters as enumerated above.

Having thus set forth my invention, I claim:
1. A composition for the production of a denture of high impact strength, low water-absorption and low curing shrinkage when polymerized, said composition consisting of (a) an intimate mixture of a copolymer of vinylidene chloride and acrylonitrile in which the copolymer contains from 50 to 90% by weight of vinylidene chloride, and polymeric methyl methacrylate in amount of from 50 to 85% by weight of the intimate mixture, and (b) monomeric methyl methacrylate in amount to plasticize the final composition, together with (c) an organic peroxide catalyst.

2. A composition for the production of a denture of high impact strength, low water-absorption and low curing shrinkage when polymerized, said composition consisting of (a) an intimate mixture of a copolymer of vinylidene chloride and acrylonitrile in which the copolymer contains 80% by weight of vinylidene chloride, and polymeric methyl methacrylate in amount from 50 to 85% by weight of the intimate mixture, and (b) monomeric methyl methacrylate in amount to plasticize the final composition, together with (c) an organic peroxide catalyst.

3. A composition for the production of a denture of high impact strength, low water-absorption and low curing shrinkage when polymerized, said composition consisting of (a) an intimate mixture of a copolymer of vinylidene chloride and acrylonitrile in which the copolymer contains 50 to 90% by weight of vinylidene chloride, and polymeric methyl methacrylate in amount of from 50 to 75% by weight of the intimate mixture, and (b) monomeric methyl methacrylate in amount to plasticize the final composition, together with (c) an organic peroxide catalyst.

4. A denture of high impact strength, low water-absorption and low curing shrinkage of a polymerized composition consisting of (a) an intimate mixture of a copolymer of vinylidene chloride and acrylonitrile in which the copolymer contains 80.0% of vinylidene chloride and has a viscosity of 8000 centipoises determined on a 20% solution in methyl ethyl ketone at 25° C. using a Brookfield viscosimeter and polymeric methyl methacrylate, and (b) monomeric methyl methacrylate, and (c) benzoyl peroxide, in the ratio of (a) to (b) to (c) of 5.0 grams of copolymer and 10 grams of polymeric methacrylate to 6.0 cc. of monomeric methyl methacrylate to 0.06 grams of peroxide.

HOMER van BEUREN JOY.

REFERENCES CITED

The following references are of record in the file of this patent:

UNITED STATES PATENTS

| Number | Name | Date |
|---|---|---|
| 2,238,020 | Hanson | Apr. 8, 1941 |
| 2,310,132 | Underdahl | Feb. 2, 1943 |
| 2,315,503 | Crowell | Apr. 6, 1943 |
| 2,459,164 | Holst et al | Jan. 18, 1949 |

FOREIGN PATENTS

| Number | Country | Date |
|---|---|---|
| 484,343 | Great Britain | May 4, 1938 |